United States Patent
Bakshi et al.

(10) Patent No.: US 12,436,759 B2
(45) Date of Patent: Oct. 7, 2025

(54) SYSTEM AND METHOD FOR DYNAMIC SWITCHING BETWEEN AN OLD VERSION AND A NEW VERSION OF A SOFTWARE CODE

(71) Applicant: Bank of America Corporation, Charlotte, NC (US)

(72) Inventors: Sakshi Bakshi, New Delhi (IN); Sudhakar Balu, Chennai (IN); Siva Kumar Paini, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 207 days.

(21) Appl. No.: 18/468,768

(22) Filed: Sep. 18, 2023

(65) Prior Publication Data
US 2025/0094162 A1    Mar. 20, 2025

(51) Int. Cl.
*G06F 9/44* (2018.01)
*G06F 8/656* (2018.01)

(52) U.S. Cl.
CPC ............... *G06F 8/656* (2018.02)

(58) Field of Classification Search
CPC .................................................. G06F 8/656
USPC ........................................................ 717/168
See application file for complete search history.

(56) References Cited

U.S. PATENT DOCUMENTS

| | | | |
|---|---|---|---|
| 7,818,215 B2 | 10/2010 | King et al. | |
| 8,040,902 B1 | 10/2011 | Raghunathan et al. | |
| 8,180,735 B2 | 5/2012 | Ansari et al. | |
| 8,316,237 B1 | 11/2012 | Felsher et al. | |
| 8,341,270 B2 | 12/2012 | Mazzaferri et al. | |
| 8,429,630 B2 | 4/2013 | Nickolov et al. | |
| 8,468,244 B2 | 6/2013 | Redlich et al. | |
| 8,521,586 B2 | 8/2013 | Angles et al. | |
| 8,566,115 B2 | 10/2013 | Moore | |
| 8,568,356 B2 | 10/2013 | Lebel et al. | |
| 8,935,275 B2 | 1/2015 | Rathod | |
| 9,204,374 B2 | 12/2015 | Raleigh | |
| 9,240,019 B2 | 1/2016 | Ricci | |
| 9,571,582 B2 | 2/2017 | Petite et al. | |
| 9,591,010 B1 | 3/2017 | Muddu et al. | |
| 9,779,126 B2 | 10/2017 | Tu et al. | |
| 9,860,709 B2 | 1/2018 | Addepalli et al. | |

(Continued)

OTHER PUBLICATIONS

Bakshi et al., U.S. Appl. No. 18/468,763, "System and method for classifying software code based on functionality and criticality," filed Sep. 18, 2023.

(Continued)

*Primary Examiner* — Evral E Bodden

(57) ABSTRACT

A system for updating a software code executes a current version of the software code on a web application. The system receives a request message to update the current version of the software code to a new version of the software code. The system determines whether the software code is still being executed on the web application. In response to determining that the software code is still being executed on the web application, the system identifies a subset of portions of the software code that have not yet been executed, executes an update instruction to cause the subset of portions of the software code to be updated, and moves the updated subset of portions of the software code from a first memory block to a second memory block.

20 Claims, 7 Drawing Sheets

(56) References Cited

U.S. PATENT DOCUMENTS

| | | |
|---|---|---|
| 9,883,309 B2 | 1/2018 | Samuelsson et al. |
| 10,248,657 B2 | 4/2019 | Prahlad et al. |
| 10,705,948 B2 | 7/2020 | Ramasamy et al. |
| 10,769,633 B2 | 9/2020 | Dua |
| 11,494,056 B1 * | 11/2022 | Ledet .................... G06F 3/0488 |
| 11,586,188 B2 | 2/2023 | Cella et al. |
| 2021/0186329 A1 | 6/2021 | Tran |
| 2022/0229957 A1 | 7/2022 | Venugopal et al. |
| 2025/0094154 A1 * | 3/2025 | Bakshi ..................... G06F 8/71 |

OTHER PUBLICATIONS

Bakshi et al., U.S. Appl. No. 18/468,775, "System and method for addressing software code update failure," filed Sep. 18, 2023.

* cited by examiner

SYSTEM AND METHOD FOR DYNAMIC SWITCHING BETWEEN AN OLD VERSION AND A NEW VERSION OF A SOFTWARE CODE

TECHNICAL FIELD

The present disclosure relates generally to information security, and more specifically to a system and method for dynamic switching between an old version and a new version of a software code.

BACKGROUND

Organizations implement various web applications on their websites to provide services and/or products to their users. To test the functionality and reliability of web applications, software code may be implemented to execute automated tasks on the web applications. For example, the software code may be executed to simulate the behavior and output of the web application in response to various input data provided by the software code. The software code is usually complex and runs for an extended period.

SUMMARY

The system described in the present disclosure is particularly integrated into practical applications of reducing interruptions in the process of updating software code and increasing efficiency in the process of updating software code. In other words, the disclosed system improves the updating process of the software code.

In an example scenario, within an organization there are many pieces of software code being executed on one or more software applications to test the functionality and reliability of the software applications in response to various inputs provided by the software code to the software application. For example, assume that an example software application is a web application with a user interface that includes text fields for users to enter user credentials to be able to enter their portal on a website. In this example, for testing the software application a software code may be provided to enter multiple instances of user credentials (e.g., user names and/or passwords) to determine whether the software application is operational and works as expected. For example, it may be determined that the software application works as expected detect if the software application issues an error message in response to a number being added to a user name that is entered into the user name text field by the software code.

In another example, assume that a software code is configured to generate multiple (e.g., thousands of) user profiles on a web application that provides an online form on a web page for users to fill out. In this example, the work flow of the software code may include navigating to a login webpage, entering user credentials, upon receiving access to a user portal, navigating to a form webpage, entering user information (such as name, address, phone number, etc.) on the form, activating or actuating a submit button on the form webpage, among others. Therefore, there may be many functions that need to be tested with respect to either or both software applications and the software code. If it is desired to update from a legacy version to a new version of a software code, the update patch or instruction may be dispatched or deployed. However, in some cases, the updated software code may not be compatible with the current/legacy version of the software application. For example, a new command or library file may be used in the updated software code that may not be compatible with the current/legacy version of the software application. This incompatibility may result in failed software code updates and/or a failed operation in the software application.

For every software code migration from legacy to new version, there may be many functions that need to be tested for each software code. This process requires a lot of processing and memory resources and is not efficient. For example, one software code may be configured to perform a few functions. However, for example, only one function may be the main function of the software code. Therefore, not all of the functions of the software code have to be tested in order to determine that the updated software code is operating as expected. In another example, the set of software code is usually being executed over a long period of time. Therefore, if an update request message is issued, using the current techniques, the set of software code may have to be interrupted to be able to be updated to the new version. This process reduces the efficiency of the updating process because the software code has to be interrupted, the update process has to be restarted, and a lot of processing and memory resources that are spent on the update process are wasted.

The present disclosure is configured to provide a solution to these and other technical problems currently arising in the realm of software update management techniques. For example, the disclosed system is configured to implement a technology to deploy and classify the software codes into different racks (e.g., memory blocks) based on their attributes, including functions, criticality levels, and common flow paths. For example, the system is configured to parse and analyze log files comprising historical executions of each software code and determine each of the functions that the software code has performed, the number of operations performed by each software code, and operations that are common between two or more software codes.

The disclosed system is further configured to implement new racks for maintaining updated software codes. For example, before the update process begins, the software code may be executed in the rack, and after the update process is completed or begins, the updated software code may be executed in a rack. If the software code is active when the update request message is received, operations of the software code that have been performed before the update request message is received may be performed in the current version of the software code, and the remaining operation of the software code may be performed by the updated version of the software code. Therefore, this process reduces (or eliminates) interruptions in the execution of the software code.

The disclosed system is further configured to address and perhaps resolve a software code update failure. For example, the disclosed system may monitor the software code after it is updated. If any error message is detected with respect to the functions of the software code, the disclosed system may determine that the update process has failed. In some embodiments, in case of the update failure, the disclosed system may switch executing the workflow of the software code back to the current version of the software code, determine the cause of the error message, address the error message, and restart the update process. In some embodiments, in case of the update failure, the disclosed system may fetch video recordings and log files of the execution of the software code, send the video recordings and log files to an operator, receive updated configuration files, and restart the update process with the updated configuration files. In some embodiments, the disclosed system may use the updated configuration files as feedback and implement similar updates to configuration files in subsequent update failure scenarios.

Accordingly, the disclosed system provides several practical applications and technical improvements to the software update management techniques. For example, the system reduces the interruptions in the execution of the software codes by allowing some operations of the software code to be executed on the current version and the remaining operations to be executed on the new version. In another example, the system provides load balancing between racks where software codes are maintained. For example, by classifying the software codes based at least on their criticality levels, software codes having the same criticality levels are grouped in the same rack. Therefore, the number of resources is substantially distributed evenly among software codes in a rack. Thus, for example, the execution of any software code does not suffer from a low number of allocated resources.

Furthermore, the system is configured to provide an additional practical application for reducing the number of resources used to test the updated software codes. For example, the system is configured to identify the common flow path among software codes in a rack and for testing the updated software codes, the system may run the operations corresponding to the common flow path. Therefore, fewer amount of processing and memory resources may be spent on testing the updated software codes due to not testing all flows of the software codes.

Classifying Software Code

In some embodiments, a system for classifying software code comprises a memory operably coupled to a processor. The memory is configured to store a first log file comprising information about the historical executions of a first software code and a second log file comprising information about the historical executions of a second software code. The processor is configured to access the first log file and the second log file. The processor is further configured to determine a first function of the first software code from the first log file. The processor is further configured to determine a first set of operations performed by the first software code from the first log file. The processor is further configured to determine that a first number of the first set of operations is within a first range of values. The processor is further configured to determine a first criticality level of the first software code based at least in part upon determining that the first number of the first set of operations is within the first range of values. The processor is further configured to determine a second function of the second software code from the second log file. The processor is further configured to determine a second set of operations performed by the second software code from the second log file. The processor is further configured to determine that a second number of the second set of operations is within the first range of values. The processor is further configured to determine a second criticality level of the second software code based at least in part upon determining that the second number of the second set of operations is within the first range of values. The processor is further configured to compare each operation from among the first set of operations with a counterpart operation from among the second set of operations. The processor is further configured to determine, based at least in part on the comparison of each operation, that the first software code has at least one operation in common with the second software code based at least in part upon the first set of operations and the second set of operations. The processor is further configured to compare the first function of the first software code with the second function of the second software code. The processor is further configured to determine, based at least in part upon the comparison of the first function and with the second function, that the first function of the first software code corresponds to the second function of the second software code. The processor is further configured to classify the first software code and the second software code in a first group, in response to determining that the first software code has at least one operation in common with the second software code, determining that the first criticality level corresponds to the second criticality level, and determining that the first function of the first software code corresponds to the second function of the second software code. The processor is further configured to receive a request to update one or more software codes associated with the first function. The processor is further configured to execute a first update instruction that causes at least a first portion of the first software code and a second portion of the second software code that is related to the first function to be updated in response to receiving the request.

Dynamic Switching Between an Old Version and a New Version of a Software Code

In some embodiments, a system for updating software code includes a memory operably coupled to a processor. The memory is configured to store a web application that is configured to provide a graphical user interface to interact with the web application, wherein the graphical user interface comprises a text field. The memory is further configured to store a software code, wherein a current version of the software code is stored in a first memory block of the memory. The processor is configured to execute the current version of the software code to perform an automated task on the web application, wherein the automated task comprises a set of operations comprising entering text in the text field of the web application. The processor is further configured to receive a request message to update the current version of the software code to a new version of the software code, wherein the request message comprises an update instruction that is configured to update the current version of the software code to the new version of the software code. The processor is further configured to determine whether the software code is still being executed to perform the automated task on the web application. In response to determining that the software code is still being executed to perform the automated task on the web application, the processor is further configured to identify a first subset of portions of the software code that has not yet been executed, execute the update instruction, wherein executing the update instruction causes the first subset of portions of the software code to be updated, and move the updated first subset of portions of the software code from the first memory block to a second memory block of the memory, wherein the second memory block is designated for the new version of the software code.

Addressing Software Code Update Failure

In some embodiments, a system for addressing a software code update failure includes a memory operably coupled to a processor. The memory is configured to store a web application that is configured to provide an interface to interact with the web application, wherein the interface comprises a text field. The memory is further configured to store a software code. The memory is further configured to store a configuration file that comprises settings for updating the software code, wherein the settings comprise a first amount of processing resources to be allocated to update the software code. The processor is configured to receive a request message to update a current version of the software code to a new version of the software code. The request message comprises an update instruction that is configured to update the current version of the software code to the new version of the software code. The update instruction is configured with the settings indicated in the configuration file. The processor is further configured to execute the update instruction to cause at least a portion of the software code to be updated, thereby generating the new version of the software code. The processor is further configured to record a log file that comprises information about an execution of the new version of the software code. The processor is further configured to capture a video recording that shows a screen of a computing device on which the new version of the software code is executed to perform an automated task on the web application. The processor is further configured to detect an error message that indicates the new version of the software code has failed. In response to detecting the error message, the processor is further configured to roll back the new version of the software code to the current version of the software code, communicate an alert message that indicates the new version of the software code has failed, wherein the alert message comprises the log file and the video recording, receive an updated configuration file, wherein the updated configuration file indicates that a second amount of processing resources is to be allocated to updating the software code, and re-execute the update instruction configured with the updated configuration file.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to classify software code, update software code, and address software code update failure. Embodiments of the present disclosure and its advantages may be understood by referring to FIGS. 1 through 7. FIGS. 1 through 7 are used to describe systems and methods to classify software code, update software code, and address software code update failure, according to some embodiments.

System Overview

Figure 1:
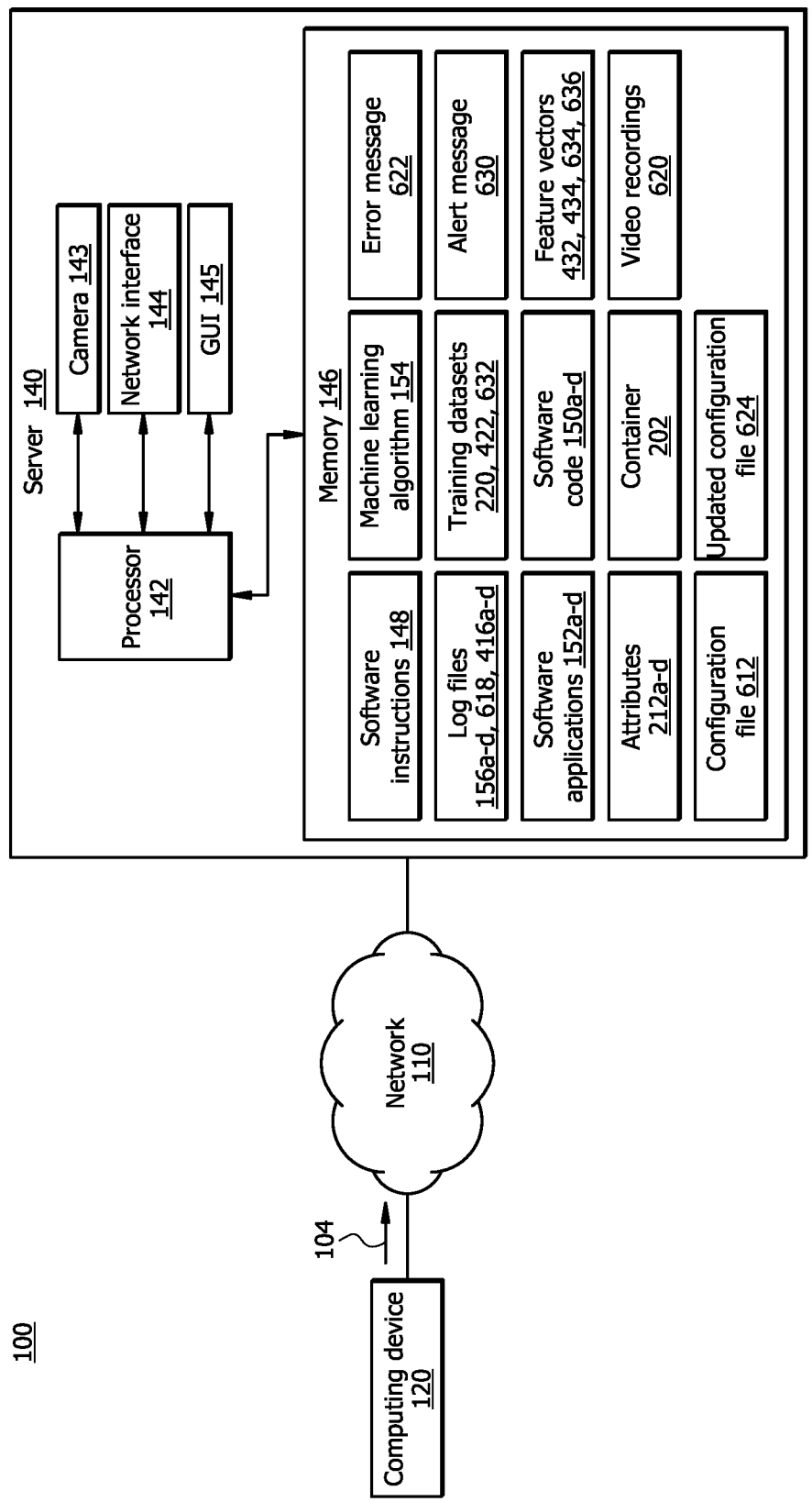
FIG. 1 illustrates an embodiment of a system configured to classify software code, update software code, and address software code update failure.

FIG. 1 illustrates an embodiment of a system 100 that is generally configured to 1) classify software code 150 based on their respective attributes 212, including functions, criticality levels, and common flow paths, 2) receive a request to update software codes 150 that are associated with a particular function, 3) in response, execute update instructions 230 that cause at least a portion of the software code 150 that is related to the particular function to be updated, 4) deploy the updated software code 150 in a new rack 210 (see FIG. 2), 5) determine whether an update process for a software code 150 has failed. 6) in response to determining a failed update process, in one embodiment, execute an auto-recovery mode instruction to restart the update process, and 7) in response to determining a failed update, in one embodiment, fetch video recordings 620 showing the execution of the software code 150 on the screen of the server 140, such as the flow of the failed update process, log files 618, etc. and, 8) communicate the video recordings 620 and log files 618 to an operator, receive an updated configuration file 624, and restart the update process with the updated configuration file 624. In some embodiments, the system 100 comprises a server 140 communicatively coupled with one or more computing devices 120 via a network 110. Network 110 enables communications between components of the system 100. The server 140 includes a processor 142 in signal communication with a memory 146. Memory 146 stores software instructions 148 that when executed by the processor 142 cause the processor 142 to perform operations of the server 140 described herein. In other embodiments, system 100 may not have all of the components listed and/or may have other elements instead of, or in addition to, those listed above.

In general, system 100 improves the updating process of the software code 150. In an example scenario, within an organization, there are many pieces of software code 150 being executed on one or more software applications 152 to test the functionality and reliability of the software applications 152 in response to various inputs provided by the software code 150 to the software application 152. For example, assume that an example software application 152 is a web application with a user interface that includes text fields for users to enter user credentials to be able to enter their portal on a website. In this example, for testing the software application 152, a software code 150 may be provided to enter multiple instances of user credentials (e.g., user names and/or passwords) to determine whether the software application 152 is operational and it works as expected. For example, it may be determined that the software application 152 works as expected detect if the software application 152 issues an error message in response to a number being added to a user name that is entered into the user name text field of the software application 152 by the software code 150.

In another example, assume that a software code 150 is configured to generate or create multiple (e.g., thousands of) user profiles on a web application 152 that provides an online form on a web page for users to fill out. In this example, the work flow of the software code 150 may include navigating to a login webpage, entering user credentials, upon receiving access to a user portal, navigating to a form webpage, entering user information (such as name, address, phone number, etc.) on the form, activating or actuating a submit button on the form webpage, among others. Therefore, there may be many functions that need to be tested with respect to either or both software applications 152 and software code 150. If it is desired to update from a legacy version to a new version of software code 150, the update patch or instruction may be dispatched or deployed. However, in some cases, the updated software code 150 may not be compatible with the current/legacy version of the software application 152. For example, a new command or library file may be used in the updated software code 150 that may not be compatible with the current/legacy version of the software application 152. This incompatibility may result in failed software code updates and/or failed operation in the software application 152.

For every software code migration from legacy to new version, there may be many functions that need to be tested per software code 150. This process requires a lot of processing and memory resources and is not efficient. For example, one software code 150 may be configured to perform a few functions. However, for example, only one function may be the main function of the software code 150. Therefore, not all of the functions of the software code 150 have to be tested in order to determine that the updated software code 150 is operating as expected. In another example, the set of software code 150 is usually executed for a long period of time. Therefore, if an update request message 104 is issued, using the current techniques, the set of software code 150 may have to be interrupted to be able to be updated to the new version. This process reduces the efficiency of the updating process because the software code 150 has to be interrupted, the update process hast to be restarted, and a lot of processing and memory resources that are spent on the update process are wasted.

The present disclosure is configured to provide a solution to these and other technical problems currently arising in the realm of software update management techniques. For example, the disclosed system 100 is configured to implement a technology to deploy and classify the software codes 150 into different racks 210 (see FIG. 2) based on their attributes 212, including functions, criticality levels, and common flow paths. For example, the system 100 is configured to parse and analyze log files 156 comprising historical executions of each software code 150 and determine each of the functions that the software code 150 has performed, the number of operations performed by each software code 150, and operations that are common between two or more software codes 150.

The disclosed system 100 is further configured to implement new racks 210 (see FIG. 2) for maintaining updated software code 150. For example, before the update process begins, the software code 150 may be executed in rack 210*a* (see FIG. 2), and after the update process is completed or begins, the updated software code 150 may be executed in rack 210*c* (see FIG. 2). If the software code 150 is active when the update request message 104 is received, operations of the software code 150 that have been performed before the update request message 104 is received may be performed in the current version of the software code 150, and remaining operation of the software code 150 may be performed by the updated version of the software code 150. Therefore, this reduces (or eliminates) interruptions in the execution of the software code 150.

The disclosed system 100 is further configured to address and perhaps resolve a software code update failure. For example, the disclosed system 100 may monitor the software code 150 after it is updated. If any error message 622 is detected with respect to the functions of the software code 150, the disclosed system 100 may determine that the update process has failed. In some embodiments, in case of the update failure, the disclosed system 100 may switch executing the workflow of the software code 150 back to the current version of the software code 150, determine the cause of the error message 622, address the error message 622, and restart the update process. In some embodiments, in case of the update failure, the disclosed system 100 may fetch video recordings 620 and log files 618 of the execution of the software code 150, send the video recordings 620 and log files 618 to an operator, receive updated configuration files 624, and restart the update process with the updated configuration files 624. In some embodiments, the disclosed system 100 may use the updated configuration files 624 as feedback and implement similar updates to configuration files 612 in subsequent update failure scenarios.

Accordingly, the system 100 provides several practical applications and technical improvements to the software update management techniques. For example, the system 100 reduces the interruptions in the execution of the software code 150 by allowing some operations of the software code 150 to be executed on the current version and the remaining operations to be executed on the new version. In another example, the system 100 provides load balancing between racks 210 (see FIG. 2) where software code 150 is maintained. For example, by classifying the software codes 150 based at least on their criticality levels, software codes 150 having the same criticality levels are grouped in a same rack 210 (see FIG. 2). Therefore, the number of resources are substantially distributed evenly among software codes 150 in a rack 210 (see FIG. 2). Thus, for example, the execution of any software code 150 does not suffer from a low number of allocated resources.

Furthermore, the system 100 is configured to provide an additional practical application for reducing the number of resources used to test the updated software codes 150. For example, the system 100 is configured to identify the common flow path among software code 150 in a rack and for testing the updated software code 150, the system 100 may run the operations corresponding to the common flow path. Therefore, a smaller amount of processing and memory resources may be spent on testing the updated software code 150 due to not testing all flows of the software code 150.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

A computing device 120 is generally any device that is configured to process data and interact with users. Examples of the computing device 120 include but are not limited to, a personal computer, a desktop computer, a workstation, a server, a laptop, a tablet computer, a mobile phone (such as a smartphone), a virtual reality device, an augmented reality device, an Internet-of-Things (IoT) device, or any other suitable type of device. The computing device 120 may include a user interface, such as a display, a microphone, a camera, a keypad, or other appropriate terminal equipment usable by users. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices and components of the system 100 via the network 110. For example, the computing device 120 may communicate request message 104 to the server 140 via the network 110 in response to a command from the user, e.g., when the user initiates the transmission of the request message 104. For example, the request message 104 may indicate that software codes 150 associated with a particular function needs to be updated. The request message 104 may include identifiers of the software codes 150 associated with the particular function and/or an identifier of the particular function. In some examples, the request message 104 may be related to a work frame, a server, a database, or querying a database function, among others.

Server

Server 140 generally includes a hardware computer system configured to 1) classify software applications based on their respective functions, criticality levels, and common flow paths, 2) receive a request to update software application(s) that are associated with a particular function, 3) in response, execute update instructions that cause at least a portion of the software application(s) that is related to the particular function to be updated, 4) deploy the updated software applications in a new rack. 5) determine whether an update process for a software application has failed, 6) is response to determining a failed update, in one embodiment, execute an auto-recovery mode instruction to restart the update process, and 7) in response to determining a failed update, in one embodiment, fetch video recordings showing the flow of the failed update process, log files, etc., communicate the video recordings and log files to an operator, receive an updated configuration file, and restart the update process with the updated configuration file. In certain embodiments, the server 140 may be implemented by a cluster of computing devices, such as virtual machines. For example, the server 140 may be implemented by a plurality of computing devices using distributed computing and/or cloud computing systems in a network. In certain embodiments, the server 140 may be configured to provide services and resources (e.g., update instructions, etc.) to other components and devices.

The server 140 comprises a processor 142 operably coupled with a camera 143, network interface 144, graphical user interface (GUI) 145, and a memory 146. Processor 142 comprises one or more processors. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the server 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-5. For example, the processor 142 may be configured to perform one or more operations of the operational flow 200 as described in FIG. 2, one or more operations of the method 300 as described in FIG. 3, one or more operations of the operational flow 400 as described in FIG. 4, one or more operations of the method 500 as described in FIG. 5, one or more operations of the operational flow 600 as described in FIG. 6, and one or more operations of the method 700 as described in FIG. 7.

Camera 143 may be or include any camera that is configured to capture images of a field of view in front of the camera 143. Examples of the camera 143 may include charge-coupled device (CCD) cameras and complementary metal-oxide semiconductor (CMOS) cameras. The camera 143 is a hardware device that is configured to capture images continuously, at predetermined intervals, or on-demand. For example, the camera 143 may be an internal camera that is configured to record the events displayed on the GUI 145 of the server 140. The GUI 145 may include the display screen of the server 140.

Network interface 144 is configured to enable wired and/or wireless communications. The network interface 144 may be configured to communicate data between the server 140 and other devices, systems, or domains. For example, the network interface 144 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be volatile or non-volatile and may comprise read-only memory (ROM), random-access memory (RAM), ternary content-addressable memory (TCAM), dynamic random-access memory (DRAM), and/or static random-access memory (SRAM). The memory 146 may include one or more of a local database, a cloud database, a network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-3 along with any other data, instructions, logic, rules, or code operable to implement the function(s) described herein when executed by processor 142. For example, the memory 146 may store software instructions 148, log files 156a-d. 618, and 416a-b, software applications 152a-d, software code 150a-d, attributes 212a-d, configuration file 612, machine learning algorithm 154, training datasets 220, 422, and 632, container 202, updated configuration file 624, error message 622, alert message 630, feature vectors 432, 434, 634, and 636, video recording 620, and/or any other data or instructions. The software instructions 148 may comprise any suitable set of instructions, logic, rules, or code operable to execute the processor 142 and perform the functions described herein, such as some or all of those described in FIGS. 1-3.

Machine learning algorithm 154 may be implemented by the processor 122 executing software instructions 148 and is generally configured to extract attributes 212 of software code 150 from a respective log file 156. This process is described in greater detail in FIG. 2. In some embodiments, the machine learning algorithm 154 may include a support vector machine, neural network, random forest, k-means clustering. Tree-based algorithm, Random Forest algorithm, etc. In some embodiments, the machine learning algorithm 154 may include data processing machine learning algorithm that is configured to analyze log files 156 to determine the attributes 212 of a software code 150 indicated in the log files 156. The machine learning algorithm 154 may be implemented by supervised, semi-supervised, and/or unsupervised machine learning. Other operations of the machine learning algorithm 154 are described in the discussion of FIGS. 2-7.

Log files 156 include information about historical executions of the software codes 150. For example, the log files 156 may include a first log file 156a that includes information about historical executions of the first software code 150a, and a second log file 156b that includes information about historical executions of the second software code 150b, among others.

The software code 150a may have been assigned to be executed on one or more software applications 152a to perform repetitive tasks, for example. Similarly, the software code 150b may have been assigned to be executed on the software applications 152b. The functions of the software codes 150a and 150b may or may not overlap. Other components stored in the memory 146 are described in the discussion of FIGS. 2-7.

Figure 2:
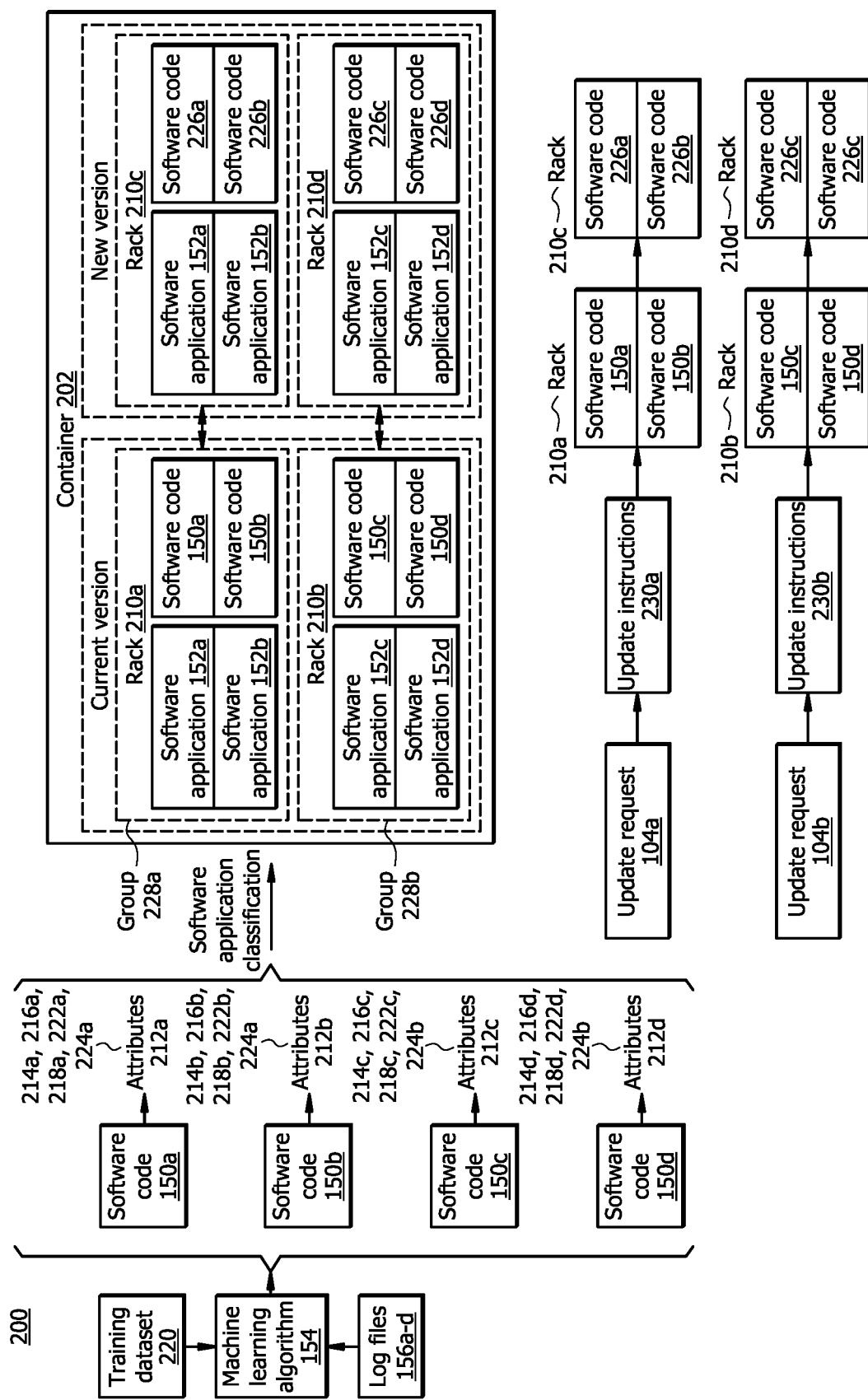
FIG. 2 illustrates an example operational flow of the system of FIG. 1 for classifying software code.

Operational Flow for Classifying Software Code and Addressing Software Code Update Failure FIG. 2 illustrates an example operational flow 200 of system 100 (see FIG. 1) for classifying software codes 150 and addressing software code update failure. In some embodiments, the current versions of software codes 150 may be classified and grouped into different racks 210a-b based on their attributes 212 comprising functions 214, criticality level 216, and a common flow path 218. To this end, the server 140 may feed the log files 156a-d to the machine learning algorithm 154. The server 140 may maintain and record the log files 156a-d as the software codes 150a-d are being executed, respectively. The log file 156a may include information about historical execution of the software code 150a. The log file 156b may include information about historical execution of the software code 150b. The log file 156c may include information about historical execution of the software code 150c. The log file 156d may include information about historical execution of the software code 150d. Each log file 156a-d may be an instance of log file 156, each software code 150a-d may be an instance of software code 150, each attribute 212a-d may be an instance of attribute 212, and each software application 152a-d may be an instance of a software application 152.

The machine learning algorithm 154 includes a neural network configured to extract the attributes 212a-d of the respective software code 150a-d from each respective log files 156a-d. For example, the machine learning algorithm 154 may extract the attributes 212a of the software code 150a from the log files 156a, extract the attributes 212b of the software code 150b from the log files 156b, extract the attributes 212c of the software code 150c from the log files 156c, and extract the attributes 212d of the software code 150d from the log files 156d. The attributes 212a of the software code 150a include the function(s) 214a, criticality level 216a, common flow path 218a, and operations 222a. The attributes 212b of the software code 150b include the function(s) 214b, criticality level 216b, common flow path 218b, and operations 222b. The attributes 212c of the software code 150c include the function(s) 214c, criticality level 216c, common flow path 218c, and operations 222c. The attributes 212d of the software code 150d include the function(s) 214d, criticality level 216d, common flow path 218d, and operations 222d.

The machine learning algorithm 154 may be trained by a training dataset 220 that includes a set of log files 156, where each portion of a log file 156 is labeled with a respective attribute 212. The machine learning algorithm 154 may use natural language processing to analyze the log files 156. In the training process, the machine learning algorithm 154 may learn the associations and relationships between each portion of a log file 156 and the respective label of attribute 212. In this process, the machine learning algorithm 154 may extract a set of features (e.g., attributes 212) from the labeled log file 156 and associate the extracted features with the respective portion of the labeled log file 156. The set of features may be represented by a feature vector comprising numerical values. In the testing process, the machine learning algorithm 154 may be given an unlabeled log file 156 and is asked to predict the attribute 212 of the software code 150 from the log file 156.

The machine learning algorithm 154 may feed the unlabeled log file 156 to the neural network and extract a first set of features (e.g., attributes 212) from the log file 156. The first set of features may be represented by a first feature vector comprising numerical values. The machine learning algorithm 154 may compare the first feature vector with each feature vector from the training dataset 220. A feature vector from the training dataset 220 may represent the features (e.g., attributes 212) of the respective software code 150 indicated in a respective labeled log file 156. For example, the machine learning algorithm 154 may compare the first feature vector with a second feature vector associated with a particular log file 156 from the training dataset 220. The machine learning algorithm 154 may determine a similarity score between the first feature vector and the second feature vector. For example, the similarity score may be determined based on Euclidean distance between the first and second feature vectors. If the Euclidean distance is less than a threshold distance (e.g., less than 1 centimeter (cm), 2 cm), the machine learning algorithm 154 may determine that the first feature vector corresponds to the second feature vector. In response, the machine learning algorithm 154 may determine one or more attributes 212 of the software code 150 associated with the unlabeled log file 156.

The functions 214 of a software code 150 may include any function, such as entering user credentials into text fields on a webpage, filling out an online form with user information, pressing or actuating buttons on a webpage, among others. The criticality level 216 of a software code 150 may be associated with a number of operations that the software code 150 is programmed to perform. For example, if the number of operations of the software code 150 is between a first range of values (between one to nine operations), the criticality level 126 of the software code 150 may be determined to be low, if the number of operations of the software code 150 is between a second range of values (between ten to nineteen operations), the criticality level 126 of the software code 150 may be determined to be medium, and if the number of operations of the software code 150 is between a third range of values (between twenty to twenty-nine operations), the criticality level 126 of the software code 150 may be determined to be high. In some examples, the criticality level 216 of a software code 150 may be indicated by identifiers, such as low, medium, high, percentage values, numbers, etc.

The common flow path 218 may include one or more operations that are common between two or more software codes 150a-d. For example, the machine learning algorithm 154 may analyze the log files 156a-d to determine whether there is any common operations between the software codes 150 indicated in the log files 156a-d. For example, assume that the machine learning algorithm 154 determines that the software code 150a and 150b have a first one or more operations in common with each other. Therefore, the machine learning algorithm 154 may determine that the common flow paths 218a and 218b include the first one or more operations. In another example, assume that the machine learning algorithm 154 determines that the software code 150c and 150d have second one or more operations in common with each other. Therefore, the machine learning algorithm 154 may determine that the common flow paths 218c and 218d include the second one or more operations. In this manner, the server 140 may determine the attributes 212a-d of the respective software codes 150a-d. Although, the example of FIG. 2 described software codes 150a-d, any number of software codes 150 may be analyzed and any number of attributes 212 may be determined by the server 140.

Classifying Software Code

The server 140 may maintain the software applications 152a-d and software codes 150a-d. 226a-d in a container 202. In some embodiments, the container 202 may be a software construct that is used to encapsulate software applications 152 and software codes 150, 226. For example, the container 202 may provide a memory block that provides an environment on the memory 146 of the server 140 locally and/or the cloud for executing software applications 152 and/or software codes 150, 226 across one or more software applications 152, respectively.

In the container 202, the current and new versions of the software codes 150a-d and 226a-d are organized and grouped into different racks 210a-d. Each rack 210a-d may be an environment, a memory block in the memory 146 of the server 140. Each of the software codes 226a-d may be a new version of the respective software code 150a-d.

The rack 210a may store the software applications 152a-b and respective software codes 150a-b because the software codes 150a-b are determined to have common or corresponding attributes 212a-b, based on their log files 156a-b, respectively. The rack 210b may store the software applications 152c-d and respective software codes 150c-d because the software code 150c-d are determined to have common or corresponding attributes 212c-d based on their log files 156c-d, respectively. The rack 210c may store the software applications 152a-b and respective software codes 226a-b (the new version of the respective software codes 150a-b). For example, the software code 226a may be the new version of the software code 150a and the software code 226b may be the new version of the software code 150b. The rack 210d may store the software applications 152c-d and respective software codes 226c-d (the new version of the software codes 150c-d). For example, the software code 226c may be the new version of the software code 150c and the software code 226d may be the new version of the software code 150d.

The server 140 may group the software codes 150a-b into a first group 228a based on their common or corresponding respective attributes 212a-b. In this process, the server 140 may determine a function 214a of the software code 150a and a first set of operations 222a performed by the software code 150a based on the log file 156a. The server 140 may determine the criticality level 216a of the software code 150a based on the first number of operations 222a performed by the software code 150a based on the log fille 156a, similar to that described above.

Regarding the software code 150b, the server 140 may determine a function 214b of the software code 150b and a second set of operations 222b performed by the software code 150b based on the log file 156b. The server 140 may determine the criticality level 216b of the software code 150b based on the second number of operations 222b performed by the software code 150b based on the log fille 156a, similar to that described above. For example, assume that it is determined that each of the first set of operations 222a of the software code 150a and the second set of operations 222b of the software code 150b is within a first range 224a of values (e.g., between one and nine).

The server 140 may compare each operation of the first set of operations 222a with a counterpart operation of the second set of operations 222b. The server 140 determines whether the software code 150a has any operation in common with the software code 150b. If it is determined that the software code 150a has at least one operation in common with the software code 150b, the server 140 may determine that the at least one operation corresponds to the common flow path 218a,b between the operations of the software codes 150a,b. The server 140 may compare the function 214a of the software code 150a with the function 214b of the software code 150b to determine if they correspond to each other. In this manner, the server 140 may use the attributes 212a-b to classify the software codes 150a-b. For example, the server 140 may classify the software codes 150a and 150b into the first group 228a if the software codes 150a and 150b have the common flow path 218a-b in common with each other, the criticality level 216a of the software code 150a corresponds to the criticality level 216b of the software code 150b, and the function 214a of the software code 150a corresponds to the function 214b of the software code 150b. Otherwise, the software codes 150a and 150b may not be classified into the same group 228a as each other.

The server 140 may perform similar operations in determining the classification of each of software codes 150c and 150d. For example, the server 140 may determine the attributes 212c of the software code 150c and attributes 212d of the software code 150d by implementing the machine learning algorithm 154, similar to that described above. The server 140 may use the attributes 212*c-d* to classify the software codes 150*c-d*. For example, the server 140 may classify the software codes 150*c* and 150*d* into the second group 228*b* if the software codes 150*c* and 150*d* have the common flow path 218*c-d* in common with each other, the criticality level 216*c* of the software code 150*c* corresponds to the criticality level 216*d* of the software code 150*d*, and the function 214*c* of the software code 150*c* corresponds to the function 214*d* of the software code 150*d*. Otherwise, the software codes 150*c* and 150*d* may not be classified into the same group 228*b* as each other.

In classifying the software code 150*c*, the server 140 may determine the function 214*c* of the software code 150*c* and the third set of operations 222*c* performed by the software code 150*c* from the log file 156*c*. The server 140 may also compare each of the third set of operations 222*c* of the software code 150*c* with the counterpart operation of the software code 150*a*. The server 140 determine whether the software code 150*a* has any operation in common with the software code 150*c*. The server 140 may also determine that the number of the third set of operations 222*c* of the software code 150*c* is within a second range 224*b* of values (e.g., between ten and nineteen) that is outside of the first range 224*a* of values that the first set of operations 222*a* of the software code 150*a* is within. The server 140 may compare the function 214*c* of the software code 150*c* with the function 214*a* of the software code 150*a*. In the example of FIG. 2, the server 140 may determine that the function 214*a* of the software code 150*a* does not correspond to the function 214*c* of the software code 150*c*. In other words, the server 140 may determine that the software codes 150*a* and 150*c* do not perform the same or similar functions. In this manner, the server 140 may compare each attribute 212*c* of the software code 150*c* with the counterpart attribute 212*a* of the software code 150*a*. The server 140 may perform similar operations between the attributes 212*c* of the software code 150*c* and the attributes 212*b* of the software code 150*b*. The server 140 may also perform similar operations between the attributes 212*c* and 212*d*.

For example, the server 140 may classify the software code 150*c* in the second group 228*b* if the software code 150*c* does not have any operation in common with the software code 150*a* and/or 150*b*, the number of operations of the software code 150*c* is within the second range 224*b* of values, and the function 214*c* of the software code 150*c* is not the same as or correspond to the function 214*a* of the software code 150*a* and/or the function 214*b* of the software code 150*b*.

Updating the Software Code

When it is desired to update a software code 150, the user may send the request message 104 from the computing device 120 (see FIG. 1) to the server 140. The request message 104 may indicate to update one or more software code 150 that is associated with a particular function 214, for example, the function 214*a*. In response to receiving the request message 104, the server 140 may identify software code(s) 150 that are indexed or labeled with the function 214*a*. For example, upon classifying the software codes 150*a-d* into their respective groups 228*a-b*, the server 140 may index or label each of the software codes 150*a-d* with the respective attributes 212*a-d*.

The software codes 150 in the same group 228*a-b* may be indexed and labeled with the respective attributes 212. In the example of FIG. 2, the server 140 may determine that the software codes 150*a-b* are associated, indexed, or labeled with the function 214*a*. Therefore, in this example, the server 140 executes the update instructions 230 that cause at least a portion of the software code 150*a* and at least a portion of the software code 150*b* that are related to and responsible for executing the function 214*a* to be updated. In some embodiments, the related portion of the software code 150*a-b* that is related to the function 214*a* may be updated. In some embodiments, one or more portions of each of the software code 150*a-b* that are affected by the function 214*a* may be updated. Upon the completion of the update process, the server 140 may store the new version of the software code 150*a* as the software code 226*a* and the new version of the software code 150*b* as the software code 226*b* in the rack 210*c*.

Continuing the example above with respect to the software code 150*c*, if the server 140 receives a second request message 104*b* that indicates to update one or more software code 150 that are associated with the function 214*c*, the server 140 may identify software code(s) 150*c-d* that are associated, indexed, and labeled with the function 214*c*. For example, during the process of classifying the software codes 150*c-d*, the software codes 150*c-d* may be indexed with the respective attributes 212-*d* by the server 140 via the machine learning algorithm 154. Therefore, in response to receiving the request message 104*b*, the server 140 may execute the update instruction 230*b* that causes the at least a portion of the software code 150*c* and at least a portion of the software code 150*d* that are related to the function 214*c* to be updated. Upon completion of the update process, the server 140 may store the new version of the software code 150*c* as the software code 226*c* and the new version of the software code 150*d* as the software code 226*d* in the rack 210*d*. In some embodiments, any software code 150*c-d* in the group 228*b* may be updated, similar to that described above.

In some embodiments, the server 140 may determine whether any two or more software codes 150*a-d* can be updated in parallel or in series. For example, software codes 150*a-d* that have a common flow path 218*a-d* may be updated in parallel in response to the update instructions 230*a*. This is because the portions of the software codes 150*a-d* that are related to the respective common flow path 218*a-d* may be performed in parallel to each other. For example, the software codes 150*a-b* may be updated in parallel at least because they have the common flow path 218*a-b* in common with each other, and the software codes 150*c-d* may be updated in parallel at least because they have the common flow path 218*c-d* in common with each other. In some embodiments, the software codes 150*a-d* that do not have a common flow path 218*a-d* with each other may be updated in series one after another.

Testing the Updated Software Code

Upon completion of the update process of the software code 150*a-b*, the server 140 may test the updated software codes 226*a-b*. As mentioned above, the software codes 226*a-b* may be programmed or configured to perform multiple functions 214*a-b*, respectively. However, each of the software codes 226*a-b* may have only one function 214*a-b* that is the main function 214*a-b* of the respective software codes 226*a-b*. Therefore, for testing whether the update process was successful, the server 140 may test the main function 214*a-b* of the respective software codes 226*a-b*.

In some embodiments, the main function 214*a-b* of the respective software codes 226*a-b* may be associated with the common flow paths 218*a-b*. Therefore, in some embodiments, for testing whether the update process was successful, the server 140 may test the operation(s) 222*a-b* that are common between the software codes 226*a-b*, i.e. . . . , the common flow paths 218*a-b*. In this process, the server 140 may execute the operation(s) 222*a-b* that are determined to be common between the software code 226*a-b*. In response, the server 140 may determine where the operation(s) 222*a-b* is failed. The server 140 may determine that operation(s) 222*a-b* is failed, for example, if an error message is received or the operation is not completed. If the server 140 determines that the operation(s) 222*a-b* has failed, the server 140 may restart the update process for the software codes 150*a-b* and re-execute the update instructions 230*a*.

Method for Classifying Software Code

Figure 3:
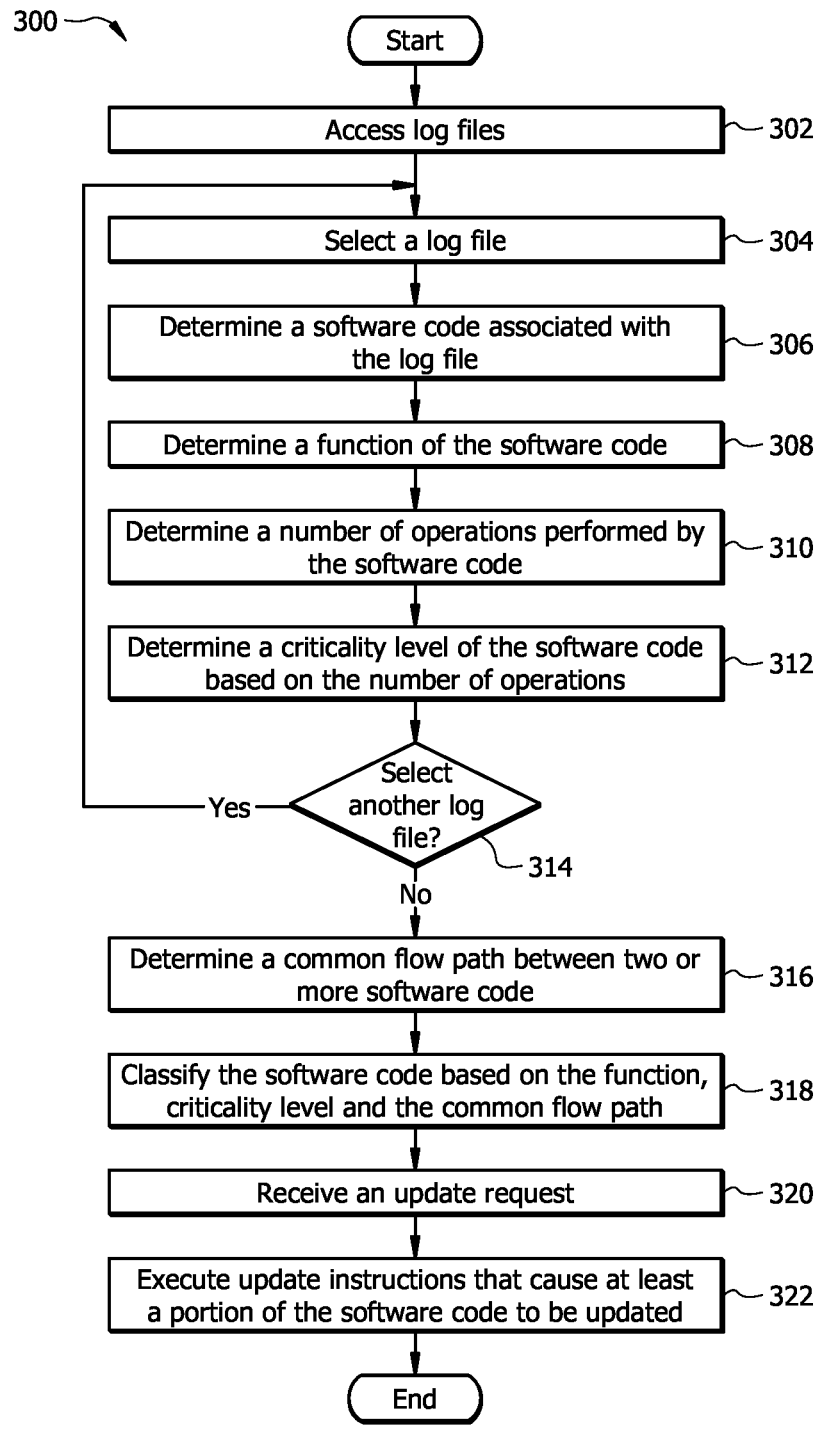
FIG. 3 illustrates an example flowchart of a method for classifying software code.

FIG. 3 illustrates an example flowchart of a method 300 for classifying software code 150*a-d* according to some embodiments of the present disclosure. Modifications, additions, or omissions may be made to method 300. Method 300 may include more, fewer, or other operations. For example, operations may be performed in parallel or in any suitable order. While at times, it is discussed that the system 100, server 140, or components of any of thereof perform certain operations, any suitable system or components may perform one or more operations of the method 300. For example, one or more operations of method 300 may be implemented, at least in part, in the form of software instructions 148 of FIG. 1, stored on a tangible non-transitory computer-readable medium (e.g., memory 146 of FIG. 1) that when run by one or more processors (e.g., processor 162 of FIG. 1) may cause the one or more processors to perform operations 302-322.

At operation 302, the server 140 accesses log files 156*a-d*. At operation 304, the server 140 selects a log file 156 from among the log files 156*a0d*. The server 140 may iteratively select a log file 156 until no log file 156 is left for evaluation.

At operation 306, the server 140 determines a software code 150 associated with the log file 156. For example, log file 156 may be associated with a label, a title, and/or any suitable identifier that indicates the software code 150. Therefore, the server 140 may determine the software code 150 associated with the log file 156 based on the identifier of the software code 150.

At operation 308, the server 140 determines a function 214 of the software code 150 from the log file 156. For example, the server 140 may feed the log file 156 to the machine learning algorithm 154 and the machine learning algorithm 154 may extract features that indicate the function 214 of the software code 150 from the log file 156, similar to that described in FIG. 2.

At operation 310, the server 140 determines the number of operations 222 performed by the software code 150 from the log file 156. For example, the server 140 may use the machine learning algorithm 154 to extract features that indicate the number of operations 222 of the software code 150, similar to that described in FIG. 2.

At operation 312, the server 140 determines a criticality level 216*a* of the software code 150 based on the number of operations 222 of the software code 150, similar to that described in FIG. 2. In operations above, the server 140 may determine the attributes 212 of the software code 150.

At operation 314, the server 140 determines whether to select another log file 156. The server 140 determines to select another log file 156 if at least one log file 156 is left for evaluation. If it is determined to select another log file 156, the method 300 may return to operation 304. Otherwise, the method 300 may proceed to operation 316. At operation 316, the server 140 determines a common path 218 between two or more software codes 150. For example, the server 140 may determine that the software codes 150*a-b* have the common flow path 218*a-b* in common with each other, and the software codes 150*c-d* have the common flow path 218*c-d* in common with each other.

At operation 318, the server 140 classifies the software code 150 based on the function 214, criticality level 216, and common flow path 218, similar to that described in FIG. 2. For example, the server 140 may classify the software codes 150*a-b* in the group 228*a* and the software codes 150*c-d* in the group 228*b*, as shown in FIG. 2.

At operation 320, the server 140 receives a request message 104. For example, the server 140 may receive the request message 104 from the computing device 120 in response to the user initiating the request message 104. The request message 104 may indicate to update one or more software codes 150 that are associated with a particular function 214.

At operation 322, the server 140 executes the update instructions 230 that cause at least a portion of software code(s) 150 that is associated with the particular function 214 to be updated.

Figure 4:
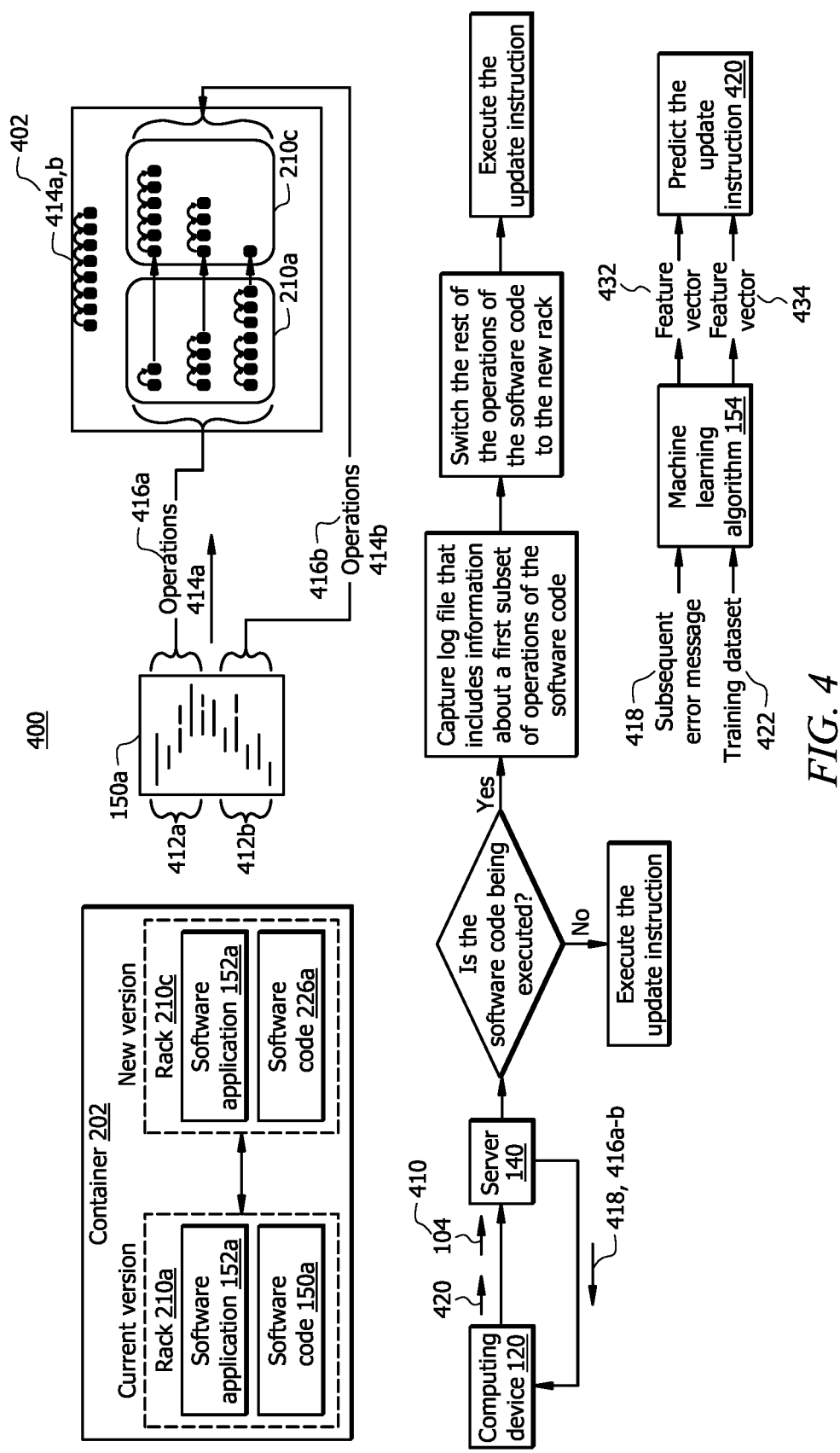
FIG. 4 illustrates an example operational flow of the system of FIG. 1 for dynamic switching between an old version and a new version of a software code.

Operational Flow for Dynamic Switching Between an Old Version and a New Version of a Software Code FIG. 4 illustrates an example operational flow 400 of system 100 (see FIG. 1) for updating a software code 150. As discussed in FIGS. 1-3, the server 140 may execute the software code 150 on a web application 152 to perform one or more respective automated task 402*s*. For example, to test the web application 152*a*, the software code 150*a* may be executed to perform an automated task 402. In one example, the web application 152 may be configured to provide a graphical user interface (145 in FIG. 1) to interact with the web application 152. In some examples, the web application 152 may include a text field on a first webpage to enter user credentials to allow users to login to their portal, an online form that includes buttons, check points, text fields, and the like for users to fill out on a second webpage. In such examples, the software code 150*a* may perform the automated task 402 of automatically entering user credentials on the text field on the first webpage, filling out the online form with previously provided user information, and actuating a submit button on the second webpage of the web application 152*a* to submit the filled-out form.

As also discussed in FIGS. 1-3, the software codes 150 may be classified into various racks 210 and new racks 210 may be designated for new versions of software codes 150. For example, in the example of FIG. 4, the software application 152*a* and the current version of the software code 150*a* (before the update process) are stored in the rack 210*a*, and upon updating the software code 150*a*, the software application 152*a* and the new version of the software code 150*a* (which is shown as the software code 226*a*) are stored in the rack 210*c*. Other racks 210 that are shown and discussed in FIG. 2 are not shown in the example of FIG. 4 for brevity.

Updating a Software Code

When it is desired to update a software code 150*a*, a user may communicate the request message 104 from the computing device 120 to the server 140. In response, the server 140 may receive the request message 104 from the computing device 120. For example, the request message 104 may include instructions to update the current version of the software code 150*a* to the new version of the software code 150*a* (i.e., to software code 226*a*). The request message 104 may also include an update instruction 410 that upon execution causes the current version of the software code 150*a* to be updated to the software code 226*a*.

In response to receiving the request message 104, the server 140 determines whether the software code 150*a* is idle or being executed to perform the automated task 402 on the web application 152*a*. For example, the server 140 may determine that the software code 150a is idle if the software code 150a is not running. i.e., is not being executed. Otherwise, if the server 140 determines that the software code 150a is performing the automated task 402 on the web application 152a, the server 140 may determine that the software code 150a is not idle.

If the server 140 determines that the software code 150a is idle, the server 140 may execute the update instruction 410 and update the current version software code 150a to the new version software code 226a. The server 140 may then store the software code 226a in the new memory block, i.e., new rack 210c as shown in FIG. 4. The server 140 may also store an instance of the software application 152a in the new rack 210c.

On the other hand, if the server 140 determines that the software code 150a is still being executed to perform the automated task 402 on the web application 152a, the server 140 may perform the following operations to update at least a portion of the software code 150a while not interrupting the execution of the software code 150a.

For example, assume that the software code 150a is configured to perform the set of operations 414a-b to perform the automated task 402. Also, assume that software code 150a includes a first subset of portions 412a and a second subset of portions 412b, and the first subset of portions 412a of the software code 150a may be configured to perform the first subset of operations 414a, and the second subset of portions 412b of the software code 150a may be configured to perform the second subset of operations 414b. In some examples, each subset of portions 412a and 412b may include one or more lines of code of the software code 150a, and each subset of operations 414a and 414b may include one or more operations. Also, assume that when the request message 104 is received, a first subset of operations 414a of the software code 150a (and the corresponding portion 412a) has already been executed. In this case, the server 140 may identify a first subset of operations 414a of the software code 150a that have been executed. The server 140 may also identify the first subset of portions 412a of the software code 150a that have been executed. The first subset of portions 412a of the software code 150a may have been executed in the rack 210a as shown in FIG. 4. The server 140 may also identify the second subset of portions 412b of the software code 150a that has not yet been executed and the second subset of operations 414b of the software code 150a that have not been executed. In response, the server 140 may execute the update instruction 410 on the remaining portions 412b of the software code 150a that have not been executed. In other words, the server 140 may update the remaining portions 412b of the software code 150a. This allows updating at least the portions 412b of the software code 150a without interrupting the execution of the software code 150a.

In some embodiments, in a next iteration of executing the software code 150a, the other portions 412a of the software code 150 may be updated with the update instruction 410. Referring back to the example above, executing the update instruction 410 on the portions 412b of the software code 150a causes the portions 412b of the software code 150a to be updated to the respective new version of the portion 412b as indicated by the update instruction 410.

In some embodiments, the server 140 may move the portions 412b of the software code 150a to the new rack 210c (i.e., to the new memory block). In response, the server 140 may facilitate the rest of operations 414b of the software code 150a to be deployed and executed in the new rack 210c.

In FIG. 4, three examples of switching the remaining operations 414b of the software code 150a from the current rack 210a to the new rack 210c are illustrated. In these examples, assume that the software code 150a is configured to perform eight operations 414 in series in order to perform the automated task 402. In a first example, two operations 414a of the software code 150a are already executed when the update request message 104 is received. In this example, the server 140 may switch and move the remaining six operations 414b of the software code 150a to the new rack 210c and update the six operations 414b according to the update instruction 410.

In a second example, four operations 414a of the software code 150a are already executed when the update request message 104 is received. In this example, the server 140 may switch and move the remaining four operations 414b of the software code 150a to the new rack 210c and update the four operations 414b according to the update instruction 410. In a second example, seven operations 414a of the software code 150a are already executed when the update request message 104 is received. In this example, the server 140 may switch and move the remaining operation 414b of the software code 150a to the new rack 210c and update the remaining operation 414b according to the update instruction 410. The new rack 210c may be designated for the new version software code 226a.

In some embodiments, before the next iteration of the operations 414a-b begins, the server 140 may update the first portions 412a of the software code 150a according to the update instruction 410, move the updated portions 412a of the software code 150a to the new rack 210c, and perform the operations 414a of the software code 226a in the new rack 210c.

Detecting and Addressing an Error Message Mid-Update Process

In some embodiments, in the case that the portions 412a of the software code 150a are already executed when the request message 104 is received, the server 140 may store a log file 416a that includes information about the execution of the portions 412a of the software code 150a. For example, the log file 416a may include metadata, such as the timestamp of execution, execution environment details, such as hardware details, and operating system), information about a user who requested the update process, version information, input parameters (such as user credentials and user information that may have been entered on the web application 152a), output parameters (such as execution status, success or failure status, warnings, error messages, etc.), execution logs (such as operations 414a), resource usage (such as an amount of processing and memory resources consumed during the execution), execution time, among other information about the portions 412a of the software code 150a.

Similarly, in some embodiments, the server 140 may store a log file 416b that includes information about the execution of the portions 412b of the software code 150a. For example, the log file 416b may include metadata, such as the timestamp of execution, execution environment details, such as hardware details, and operating system), information about a user who requested the update process, version information, input parameters (such as user credentials and user information that may have been entered on the web application 152a), output parameters (such as execution status, success or failure status, warnings, error messages, etc.), execution logs (such as operations 414b), resource usage (such as an amount of processing and memory resources consumed during the execution), execution time, among other information about the portions 412b of the software code 150a.

In some embodiments, the server 140 may use the log files 416a-b to analyze the execution of the software code 150a, 226a. For example, if the server 140 receives an error message 418 regarding the update process or the new version software code 226a, the server 140 may use the log files 416a-b to address the failed update or failed software code 226a.

For example, the server 140 may roll back the new version software code 226a to the current version software code 150a if it receives the error message 418 that indicates the new version software code 226a has failed.

In another example, in response to receiving the error message 418, the server 140 may communicate the log files 416a-b to the computing device 120 from which the update request message 104 is received for the user review or another computing device. The server 140 may also communicate the error message 418 along with the log files 416a-b. The user may review the log file 416a-b and the error message 418 and determine the cause of the error message 418.

The user may send a second update instruction 420 (in a second request message 104) to the server 140, where the second update instruction 420 may address and perhaps resolve the cause of the error message 418. In response to receiving the second update instruction 420, the server 140 may execute the second update instruction 420, similar to that described above with respect to the update instruction 410.

In some embodiments, the server 140 may learn the association between the error message 418 and the update instruction 420 via the machine learning algorithm 154 by implementing a supervised machine learning technique. In response, the server 140 may predict a solution (i.e., update instruction 420) to address and perhaps resolve subsequent error messages 418 by feeding the subsequent error message 418 to the machine learning algorithm 154 and determining to which update instruction 420, it may be associated. In other words, the server 140 may use the update instruction 420 as feedback and training dataset 422 to predict subsequent update instruction 420 to address and perhaps resolve the subsequent error message 418.

In this process, in the training stage, the machine learning algorithm 154 may label each error message 418 with the respective update instruction 420. The machine learning algorithm 154 includes the error messages 418, each labeled with the respective update instruction 420 in the training dataset 422. The machine learning algorithm 154 may feed the training dataset 422 to the neural network to extract features of the error message 418 and update instruction 420. This leads the machine learning algorithm 154 to learn what solutions (e.g., the update instruction 42) are used to address and perhaps resolve the error message 418. The extracted features may represent the context, error, and portion of the software code 150a that is associated with the error, the solution to address and perhaps resolve the error, among others. The extracted features may be represented by a first feature vector 434.

The machine learning algorithm 154 uses this information as training dataset 422 to predict the update instruction 420 for the subsequent error message 418. For example, the training dataset 422 may include a set of error messages 418, where each error message 418 is labeled with a respective update instruction 420. In the testing stage, the machine learning algorithm 154 may be given the error message 418 without a label of solution (i.e., the update instruction 420) and is asked to predict the solution that addresses and perhaps resolves the error message 418. The machine learning algorithm 154 may feed the error message 418 to the neural network to extract its features, including the context, error, and portion of the software code 150a associated with the error, among others. The extracted features may be represented by a second feature vector 434. The machine learning algorithm 154 may compare the second feature vector 434 with each feature vector 432. For example, the machine learning algorithm 154 may determine a similarity between the second feature vector 434 and each feature vector 432 from the training dataset. For example, the machine learning algorithm 154 may determine the Euclidean distance between the first feature vector 432 from the training data and the second feature vector 434. If the determined Euclidean distance is less than a threshold distance (e.g., less than 0.1 cm, 0.2 cm, etc.), the machine learning algorithm 154 may determine that the second feature vector 434 is similar or corresponds to the first feature vector 432. In response, the machine learning algorithm 154 may determine that the unlabeled error message 418 (associated with the second feature vector 434) may be addressed or perhaps resolved with the update instruction 420 that is associated with the error message 418 (associated with the first feature vector 432) from the training dataset.

In some embodiments, the server 140 may move and/or switch back the portions 412a of the software code 150a that have been executed to the rack 210a if the server 140 receives the error message 418.

Figure 5:
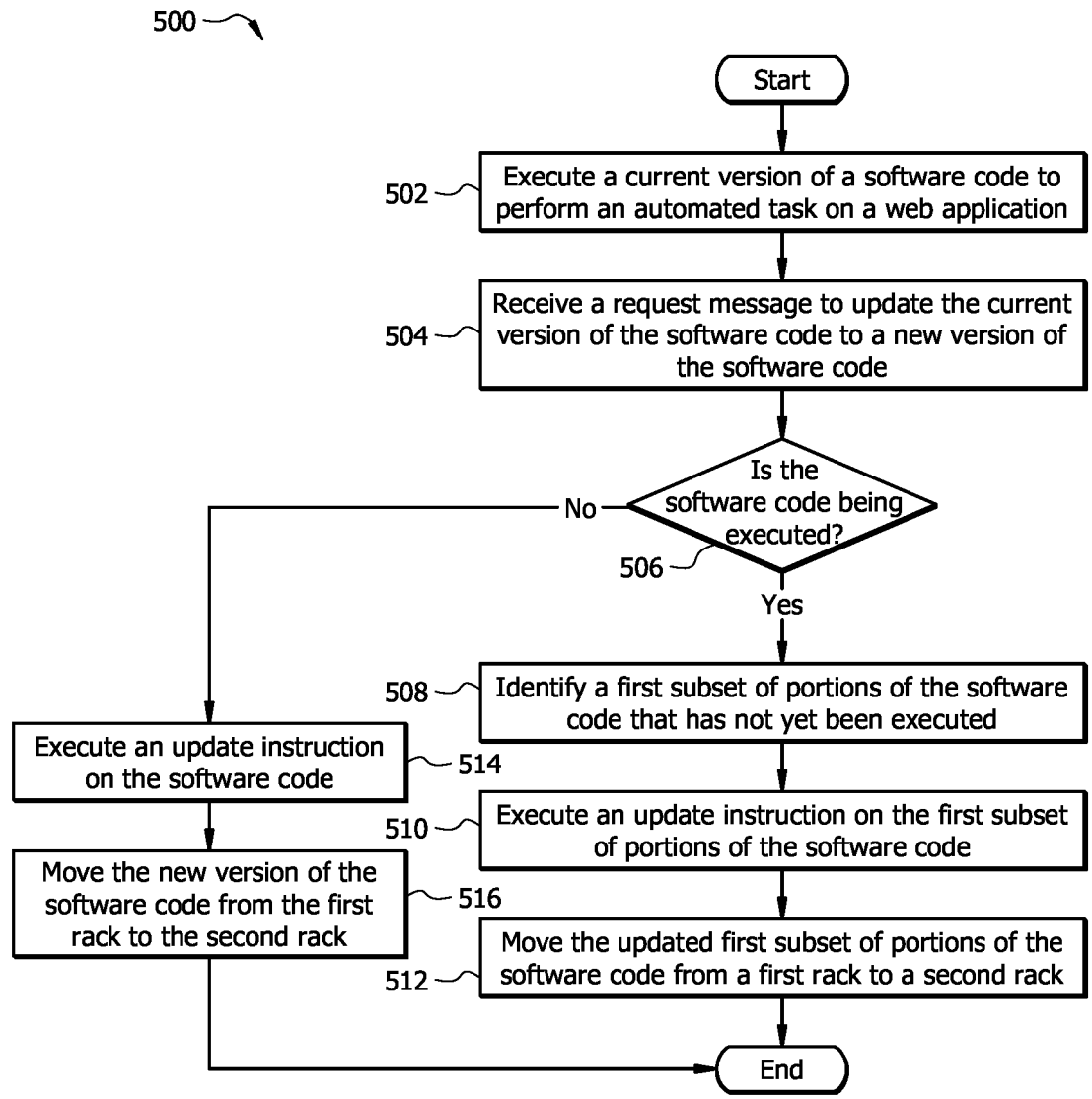
FIG. 5 illustrates an example flowchart of a method for dynamic switching between an old version and a new version of a software code.

Example Method for Dynamic Switching Between an Old Version and a New Version of a Software Code FIG. 5 illustrates an example flowchart of a method 500 for updating a software code 150a by dynamic switching between an old version and a new version of a software code 150a, according to some embodiments of the present disclosure. Modifications, additions, or omissions may be made to method 500. Method 500 may include more, fewer, or other operations. For example, operations may be performed in parallel or in any suitable order. While at times, it is discussed that the system 100, server 140, or components of any of thereof perform certain operations, any suitable system or components may perform one or more operations of the method 500. For example, one or more operations of method 500 may be implemented, at least in part, in the form of software instructions 148 of FIG. 1, stored on a tangible non-transitory computer-readable medium (e.g., memory 146 of FIG. 1) that when run by one or more processors (e.g., processor 162 of FIG. 1) may cause the one or more processors to perform operations 502-516.

At operation 502, the server 140 executes the current version of the software code 150a to perform the automated task 402 on the web application 152a, similar to that described in FIGS. 1-4.

At operation 504, the server 140 receives a request message 104 to update the current version of the software code 150a to the new version of the software code 150a. For example, the server 140 may receive the request message 104 from the computing device 120, similar to that described in FIGS. 1-4. The request message 104 may include update instruction 410, At operation 506, the server 140 determines whether the software code 150a is being executed on the web application 152a to perform the task 402. If the server 140 determines that the software code 150a is being executed, the method 500 proceeds to operation 508. Otherwise, the method 500 proceeds to operation 514.

At operation 508, the server 140 identifies a first subset of portions 412a of the software code 150a that has not yet been executed. For example, the server 140 may track the progress of the software code 150a using any tracking technique and parsing the execution log files of the software code 150a.

At operation 510, the server 140 executes the update instruction 410 on the first subset of portions 412a of the software code 150a, thereby updating the portion 412a of the software code 105a. At operation 512, the server 140 moves or switches the updated first subset of portions 412a of the software code 150a from the first rack 210a to the second rack 210c.

At operation 514, the server 140 executes the updated instruction 410 on the software code 150a. This may cause all the portions 412a-b of the software code 150a to be updated according to the update instruction 410. At operation 516, the server 140 moves the new version of the software code 150a from the first rack 210a to the second rack 201c.

Example Operational Flow for Addressing a Software Code Update Failure

Figure 6:
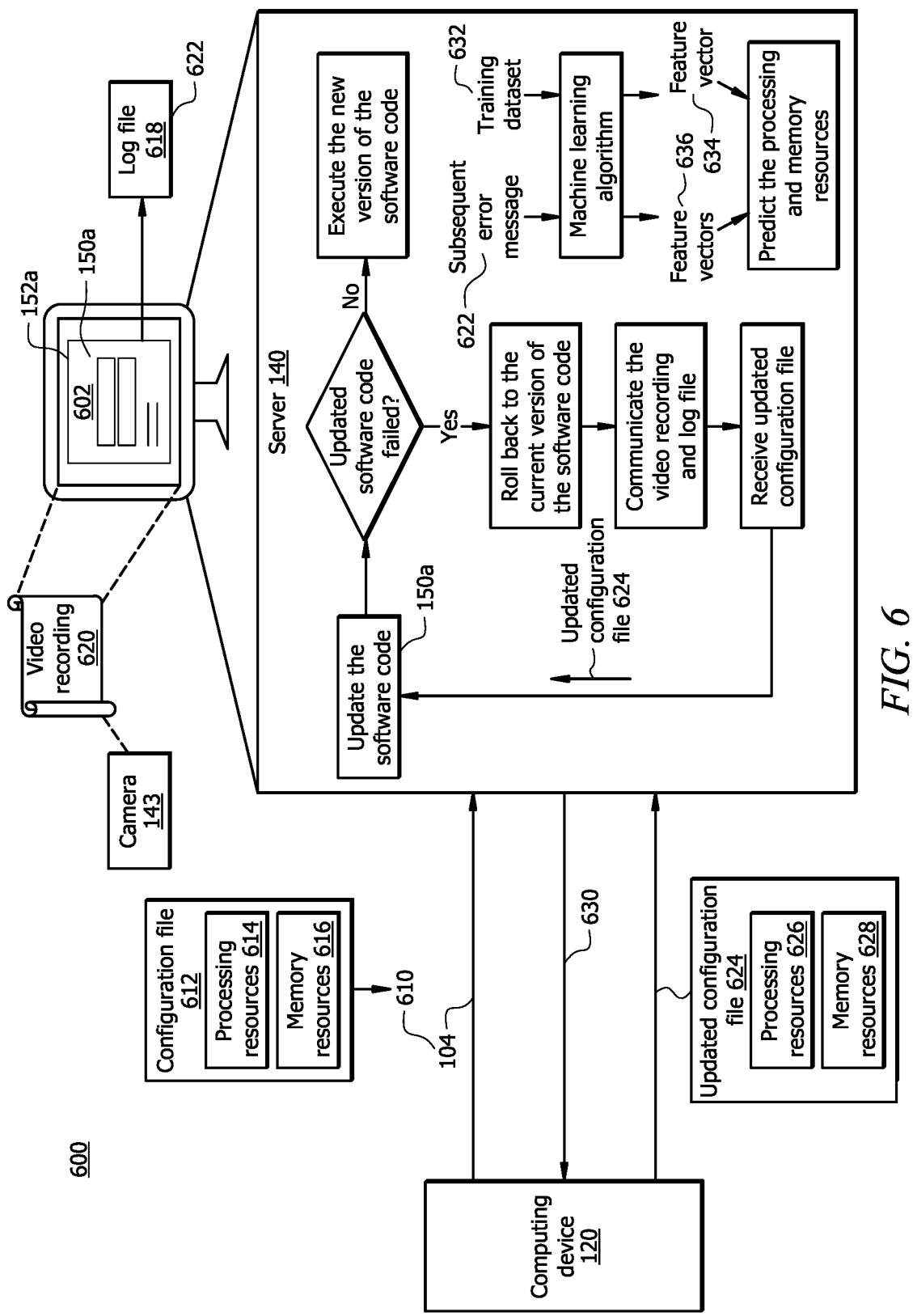
FIG. 6 illustrates an example operational flow of the system of FIG. 1 for addressing software code update failure.

FIG. 6 illustrates an example operational flow 600 of system 100 of FIG. 1 for addressing a software code update failure. In some cases, the amount of processing and/or memory resources that is allocated to the updating process of a software code 150a may not be sufficient. Therefore, the updating process of the software code 150a may fail and/or a new version of the software code 150a may fail as a result of insufficient processing and/or memory resources. In some examples, an update process may take too long and a timeout parameter associated with the update process may be reached. In such examples, the update process may fail. In some examples, as the result of insufficient processing and/or memory resources, the new version of the software code 150a may not be deployed properly. The system 100 of FIG. 1 is configured to identify such cases and address and perhaps resolve a failed update process.

The operational flow 600 may begin when the request message 104 is received at the server 140, similar to that described in FIGS. 1-5. For example, when it is desired to update a software code 150a, the user may send the request message 104 that indicates to update the current version of the software code 150a to the new version of the software code 150a. The update instruction 610 may be configured with settings indicated in the configuration file 612. The configuration file 612 may include settings for updating the software code 150a. For example, the configuration file 612 may include settings, such as an amount of processing resources 614 to be allocated for the updating process and an amount of memory resources 616 to be allocated for the updating process.

In response to receiving the request message 104, the server 140 may proceed with updating the software code 150a according to the configuration file 612. In this process, the server 140 may execute the update instruction 610 that causes at least a portion (e.g., portion 412a and/or portion 412b) of the software code 150a to be updated and generate the new version of the software code 150a. In this process, the server 140 may allocate the amount of processing resources 614 and the amount of memory resources 616 to the updating process of the software code 150a.

Tracking the Software Update Process

While updating the software code 150a and the software code 150a is being executed on the web application 152a, the server 140 may record the progress of the update process and the software code 150a in execution log files 618. For example, the server 140 may store the information about the execution of the new version of the software code 150a, the execution of the current version of the software code 150a, and the update process in the log file 618. In this process, the server 140 may execute the software code 150a to perform the automated task 402 on the web application 152a, similar to that described in FIGS. 1-5. In some embodiments, the software code 150a may be executed on the web application 152a that is accessed from the server 140, the computing device 120, and/or another device.

In some embodiments, while the software code 150a is performing the task 402, the server 140 may trigger the camera 143 to capture the video recording 620 that shows the screen of the server 140 on the GUI 145 where the new version of the software code 150a is being executed to perform the automated task 402. In other embodiments, the software code 150a may be executed on another device (e.g., computing device 120) associated with a camera and the server 140 may receive the video recording 620 from the other device when the camera associated with the other device captures the video recording 620. In some embodiments, the server 140 may also capture other data recordings, such as audio recordings, thermal recordings, electromagnetic signal recordings, electrical signal recordings, among others, that include information about the execution of the software code 150a on the web application 152a.

In response, the server 140 may then determine whether the new version of the software code 150a is performing the predefined task 402. For example, if the server 140 detects an error message 622 with respect to the new version of the software code 150a or the update process, the server 140 may determine that the new version of the software code 150a is not performing the predefined task 402. In other words, if the server 140 detects an error message 622 with respect to the new version of the software code 150a or the update process, the server 140 may determine that the software code update has failed. In some examples, the error message 622 may indicate that the new version of the software code 150a and/or the update process has failed. In some embodiments, the error message 622 may be in response to the new version of the software code 150a not being compatible with the web application 152a. For example, the new version of the software code 150a may have used a library file that is not compatible with some or all portions of the web application 152a. In some examples, the error message 622 may be indicated in the log files 618.

Detecting and Addressing the Software Update Failure

In response to detecting the error message 622, the server 140 may perform one or more of the following operations to address and perhaps resolve the error message 622. In some embodiments, the server 140 may roll back the new version of the software code 150a to the current version of the software code 150a. In other words, in some embodiments, the server 140 may execute the automated task 402 on the web application 152a by the current version of the software code 150a instead of the new version of the software code 150a.

In some embodiments, the server 140 may communicate an alert message 630 that indicates the new version of the software code 150a has failed. For example, the server 140 may communicate the alert message 630 to the computing device 120 from which the update request message 104 is initiated or to another computing device 120. For example, the alert message 630 may include the error message 622, the log file 618, and the video recording 620. The user may access and view the alert message 630, e.g., at the computing device 120. The user may determine the cause of the error message 622 and update the configuration file 612, generating the updated configuration file 624. For example, the updated configuration file 624 may include a number of processing resources 626 and a number of memory resources 628, where the number of processing resources 626 may be greater than the number of processing resources 614 and/or the number of memory resources 628 may be greater than the number of memory resources 616.

In response to receiving the updated configuration file 624, in a second iteration, the server 140 may re-execute the update instruction 610 configured with the updated configuration file 624. For example, the server 140 may allocate the number of processing resources 626 and the number of memory resources 628 to updating the software code 150*a* process.

In some embodiments, the user may also update or revise the update instructions 610, where the revised update instructions 610 may address and perhaps remedy the update failure and hence the error message 622. The user may transmit the revised update instructions 610 to the server 140. The server 140 may use the revised update instruction 610 configured with the updated configuration file 624 to update the software code 150*a*.

In some embodiments, the server 140 may label the error message 622 with the updated configuration file 624 and use this information as a part of a training dataset. For example, the server 140 may generate a training dataset 632 comprising multiple error messages 622, where each error message 622 is labeled and associated with a respective updated configuration file 624 that is configured to provide a solution to address and perhaps resolve the respective error message 622.

The server 140 may use the training dataset 632 in predicting the processing and memory resources that are required to address and perhaps resolve subsequent error messages 622.

In this process, the server 140 may feed the error message 622 and the configuration file 624 to the machine learning algorithm 154 to extract a set of features from each error message 622 labeled with a respective updated configuration file 624, where the set of features may represent the context and the error indicated in each respective error message 622. Each set of features may be represented by a first feature vector 634 comprising numerical values. The server 140, via the machine learning algorithm 154, may learn to associate the error message 622 with the configuration file 624.

In the testing process, the server 140 may be given an error message 622 that is not labeled with a configuration file 624 and is asked to predict the configuration file 624, for example, the amount of processing and memory resources to address the error message 622 based on the training dataset 632 that includes historical error messages 622, each labeled with a respective configuration file 624.

In response, the server 140 may feed the error message 622 to the machine learning algorithm 154 to extract a second set of features from the error message 622, where the second set of features includes the context and error indicated in the error message 622. The second set of features may be represented by a second feature vector 636. The server 140 may compare the second feature vector 636 with each feature vector 634. For example, the server 140 may determine the Euclidean distance between the second feature vector 636 and each feature vector 634. If the server 140 determines that the Euclidean distance between the second feature vector 636 and a first feature vector 634 is less than a threshold distance (e.g., less than 0.2 cm, 0.1 cm, etc.), based on the comparison, the server 140 may determine that the subsequent error message 622 associated with the second feature vector 636 corresponds to a historical error message 622 associated with the first feature vector 634. In response, the server 140 may determine that the configuration file 624 labeled with the historical error message 622 may be used to address and perhaps resolve the subsequent error message 622.

In some embodiments, the server 140 may determine whether the error message 622 is due to an external device. For example, if the server 140 may determine that a query operation to fetch data from an external server or database has failed, the server 140 determines that the error message 622 is due to an error from the external device. In response, the server 140 may restart or re-execute the update instruction 610 at least because the failed update was not due to insufficient processing or memory resources.

Example Method for Addressing a Software Code Update Failure

Figure 7:
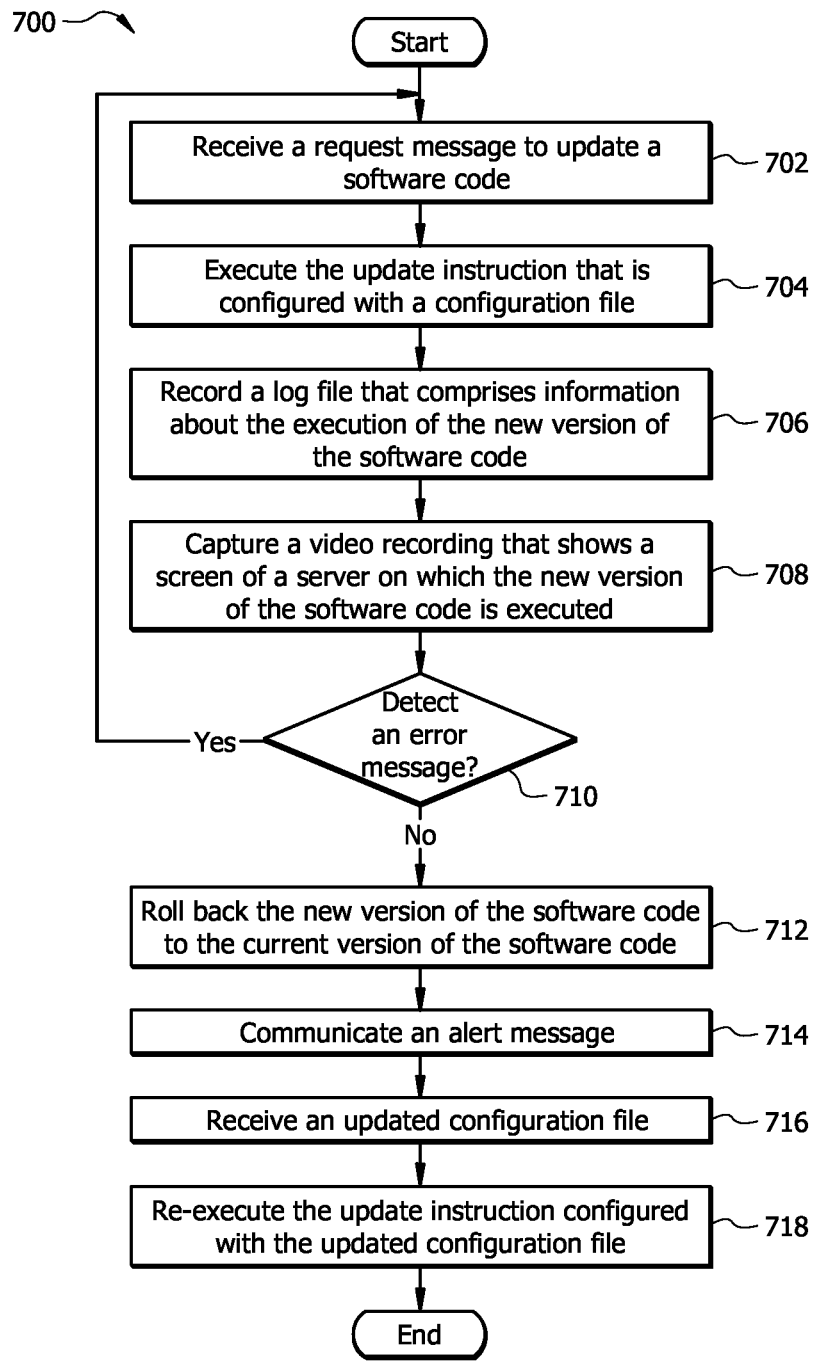
FIG. 7 illustrates an example flowchart of a method for addressing software code update failure.

FIG. 7 illustrates an example flowchart of a method 700 for addressing a software code update failure according to some embodiments of the present disclosure. Modifications, additions, or omissions may be made to method 700. Method 700 may include more, fewer, or other operations. For example, operations may be performed in parallel or in any suitable order. While at times, it is discussed that the system 100, server 140, or components of any of thereof perform certain operations, any suitable system or components may perform one or more operations of the method 700. For example, one or more operations of method 700 may be implemented, at least in part, in the form of software instructions 148 of FIG. 1, stored on a tangible non-transitory computer-readable medium (e.g., memory 146 of FIG. 1) that when run by one or more processors (e.g., processor 162 of FIG. 1) may cause the one or more processors to perform operations 702-718.

At operation 702, the server 140 receives a request message 104 to update a current version of the software code 150*a* to the current version of the software code 150*a*, similar to that described in FIG. 1-6. For example, the server 140 may receive the request message 104 from the computing device 120 when the user initiates the request message 104.

At operation 704, the server 140 executes the update instruction 610 that is configured with a configuration file 612. For example, the server 140 may allocate the processing and memory resources to the update process of the software code 150*a* as indicated in the configuration file 612, similar to that described in FIG. 6. The update instruction 610 may be configured to update at least a portion of the software code 150*a*.

At operation 706, the server 140 records the log file 608 which comprises information about the execution of the new version of the software code 150*a*, similar to that described in FIG. 6.

At operation 708, the server 140 captures the video recording 620 which shows the screen of the server 140 on which the new version of the software code 150*a* is executed. For example, the server 140 triggers the camera 143 to capture the video recording 620.

At operation 710, the server 140 determines whether an error message 622 is detected. For example, the server 140 may search the log file 618 and/or other log files to determine whether they include the error message 622. If the server 140 detects the error message 622, the method 700 proceeds to operation 712. Otherwise, the method 700 may return to operation 702.

At operation 712, the server 140 rolls back the new version of the software code 150a to the current version of the software code 150a, similar to that described in FIG. 6.

At operation 714, the server 140 communicates the alert message 630, for example, to the computing device 120. The alert message 630 may include the log file 618, and the video recording 629, among other data.

At operation 716, the server 140 receives an updated configuration file 624, for example, from the computing device 120. For example, the server 140 may receive the updated configuration file 624 when the user initiates the transmission of the updated configuration file 624.

At operation 718, the server 140 re-executes the update instruction 610 configured with the updated configuration file 624. For example, the server 140 may allocate the processing and memory resources that are indicated in the updated configuration file 624 to the update process of the software code 150a.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for updating a software code, comprising:
a memory configured to store:
   a web application that is configured to provide a graphical user interface to interact with the web application, wherein the graphical user interface comprises a text field; and
   a software code, wherein a current version of the software code is stored in a first memory block of the memory; and
a processor operably coupled to the memory, and configured to:
   execute the current version of the software code to perform an automated task on the web application, wherein the automated task comprises a set of operations comprising entering text in the text field of the web application;
   receive a request message to update the current version of the software code to a new version of the software code, wherein the request message comprises an update instruction that is configured to update the current version of the software code to the new version of the software code;
   determine whether the software code is still being executed to perform the automated task on the web application; and
   in response to determining that the software code is still being executed to perform the automated task on the web application:
      identify a first subset of portions of the software code that has not yet been executed;
      execute the update instruction, wherein executing the update instruction causes the first subset of portions of the software code to be updated; and
      move the updated first subset of portions of the software code from the first memory block to a second memory block of the memory, wherein the second memory block is designated for the new version of the software code.

2. The system of claim 1, wherein the processor is further configured to:
receive an error message that indicates the new version of the software code has failed; and
in response to receiving the error message, roll back the new version of the software code to the current version of the software code.

3. The system of claim 2, wherein the processor is further configured to:
store a first log file that comprises information about an execution of the first subset of portions of the software code;
identify a second subset of portions of the software code that has been executed;
store a second log file that comprises information about an execution of the second subset of portions of the software code; and
in response to receiving the error message:
   communicate the first log file and the second log file;
   receive user input indicating a cause of the error message;
   receive a second update instruction, wherein the second update instruction addresses the cause of the error message; and
   execute the second update instruction.

4. The system of claim 3, wherein the processor is further configured, in response to receiving the error message, to move back the first subset of portions of the software code from the second memory block to the first memory block.

5. The system of claim 1, wherein the software code is configured to create user profiles for a plurality of users on the web application.

6. The system of claim 5, wherein the set of operations further comprises:
for each user from among the plurality of users:
   entering a user credential associated with a user into a first text field on a first web page;
   filling out a form with user information associated with the user on a second webpage; and
   submitting the filled-out form on the second webpage.

7. The system of claim 1, wherein the processor is further configured, in response to determining that the software code is not being executed, to execute the update instruction.

8. A method for updating a software code, comprising:
executing a current version of a software code to perform an automated task on a web application, wherein:
   the web application is configured to provide a graphical user interface to interact with the web application;

the graphical user interface comprises a text field;
the current version of the software code is stored in a first memory block of a memory; and
the automated task comprises a set of operations comprising entering text in the text field of the web application;
receiving a request message to update the current version of the software code to a new version of the software code, wherein the request message comprises an update instruction that is configured to update the current version of the software code to the new version of the software code;
determining whether the software code is still being executed to perform the automated task on the web application; and
in response to determining that the software code is still being executed to perform the automated task on the web application:
identifying a first subset of portions of the software code that has not yet been executed;
executing the update instruction, wherein executing the update instruction causes the first subset of portions of the software code to be updated; and
moving the updated first subset of portions of the software code from the first memory block to a second memory block of the memory, wherein the second memory block is designated for the new version of the software code.

9. The method of claim 8, further comprising:
receiving an error message that indicates the new version of the software code has failed; and
in response to receiving the error message, rolling back the new version of the software code to the current version of the software code.

10. The method of claim 9, further comprising:
storing a first log file that comprises information about an execution of the first subset of portions of the software code;
identifying a second subset of portions of the software code that has been executed;
storing a second log file that comprises information about an execution of the second subset of portions of the software code; and
in response to receiving the error message:
communicating the first log file and the second log file;
receiving user input indicating a cause of the error message;
receiving a second update instruction, wherein the second update instruction addresses the cause of the error message; and
executing the second update instruction.

11. The method of claim 10, further comprising, in response to receiving the error message, moving back the first subset of portions of the software code from the second memory block to the first memory block.

12. The method of claim 8, wherein the software code is configured to create user profiles for a plurality of users on the web application.

13. The method of claim 12, wherein the set of operations further comprises,
for each user from among the plurality of users:
entering a user credential associated with a user into a first text field on a first web page;
filling out a form with user information associated with the user on a second webpage; and
submitting the filled-out form on the second webpage.

14. The method of claim 8, further comprising, in response to determining that the software code is not being executed, executing the update instruction.

15. A non-transitory computer-readable medium storing instructions that, when executed by a processor, cause the processor to:
execute a current version of a software code to perform an automated task on a web application, wherein:
the web application is configured to provide a graphical user interface to interact with the web application;
the graphical user interface comprises a text field;
the current version of the software code is stored in a first memory block of a memory; and
the automated task comprises a set of operations comprising entering text in the text field of the web application;
receive a request message to update the current version of the software code to a new version of the software code, wherein the request message comprises an update instruction that is configured to update the current version of the software code to the new version of the software code;
determine whether the software code is still being executed to perform the automated task on the web application; and
in response to determining that the software code is still being executed to perform the automated task on the web application:
identify a first subset of portions of the software code that has not yet been executed;
execute the update instruction, wherein executing the update instruction causes the first subset of portions of the software code to be updated; and
move the updated first subset of portions of the software code from the first memory block to a second memory block of the memory, wherein the second memory block is designated for the new version of the software code.

16. The non-transitory computer-readable medium of claim 15, wherein the instructions further cause the processor to:
receive an error message that indicates the new version of the software code has failed; and
in response to receiving the error message, roll back the new version of the software code to the current version of the software code.

17. The non-transitory computer-readable medium of claim 16, wherein the instructions further cause the processor to:
store a first log file that comprises information about an execution of the first subset of portions of the software code;
identify a second subset of portions of the software code that has been executed;
store a second log file that comprises information about an execution of the second subset of portions of the software code; and
in response to receiving the error message:
communicate the first log file and the second log file;
receive user input indicating a cause of the error message;
receive a second update instruction, wherein the second update instruction addresses the cause of the error message; and
execute the second update instruction.

18. The non-transitory computer-readable medium of claim 17, wherein the instructions further cause the processor to, in response to receiving the error message, move back the first subset of portions of the software code from the second memory block to the first memory block.

19. The non-transitory computer-readable medium of claim 15, wherein the software code is configured to create user profiles for a plurality of users on the web application.

20. The non-transitory computer-readable medium of claim 19, wherein the set of operations further comprises:
   for each user from among the plurality of users:
      entering a user credential associated with a user into a first text field on a first web page;
      filling out a form with user information associated with the user on a second webpage; and
      submitting the filled-out form on the second webpage.

* * * * *